(12) United States Patent
Hanna

(10) Patent No.: US 7,628,249 B2
(45) Date of Patent: Dec. 8, 2009

(54) AUTOMOTIVE SPEAKER ENCLOSURE

(75) Inventor: Fadi S. Hanna, Shelby Township, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 223 days.

(21) Appl. No.: 11/759,501

(22) Filed: Jun. 7, 2007

(65) Prior Publication Data

US 2008/0302594 A1 Dec. 11, 2008

(51) Int. Cl.
*H05K 5/00* (2006.01)
*H04R 1/02* (2006.01)
*A47B 81/06* (2006.01)

(52) U.S. Cl. .................... 181/150; 181/141; 181/199

(58) Field of Classification Search .............. 181/199, 181/150, 141
See application file for complete search history.

(56) References Cited

U.S. PATENT DOCUMENTS

| 4,733,748 A | * | 3/1988 | Ponticelli, Jr. | 181/141 |
| 4,928,788 A | * | 5/1990 | Erickson | 181/141 |
| 5,532,437 A | * | 7/1996 | Simplicean et al. | 181/150 |
| 5,736,689 A | * | 4/1998 | Van Hout et al. | 181/141 |
| 6,457,547 B2 | * | 10/2002 | Novitschitsch | 181/150 |

* cited by examiner

*Primary Examiner*—Jeffrey Donels
*Assistant Examiner*—Christina Russell
(74) *Attorney, Agent, or Firm*—Ralph E. Smith

(57) ABSTRACT

A speaker enclosure mounted within an internal wall of a vehicle may employ first and second enclosure halves that are vibration welded together to define an enclosure or cavity between the halves. A first leg and a second leg protrude from a bottom of the second half. The legs may have strengthening ribs to govern leg deflection resistance and further each have a resilient s-shaped tab protruding from the distal end of each leg to contact the wall of the vehicle. A first and a second fastener leg may each define a fastener hole and accept a fastener to help secure the speaker enclosure along with the first and second resilient legs. The fastener legs each may protrude from an enclosure half.

17 Claims, 6 Drawing Sheets

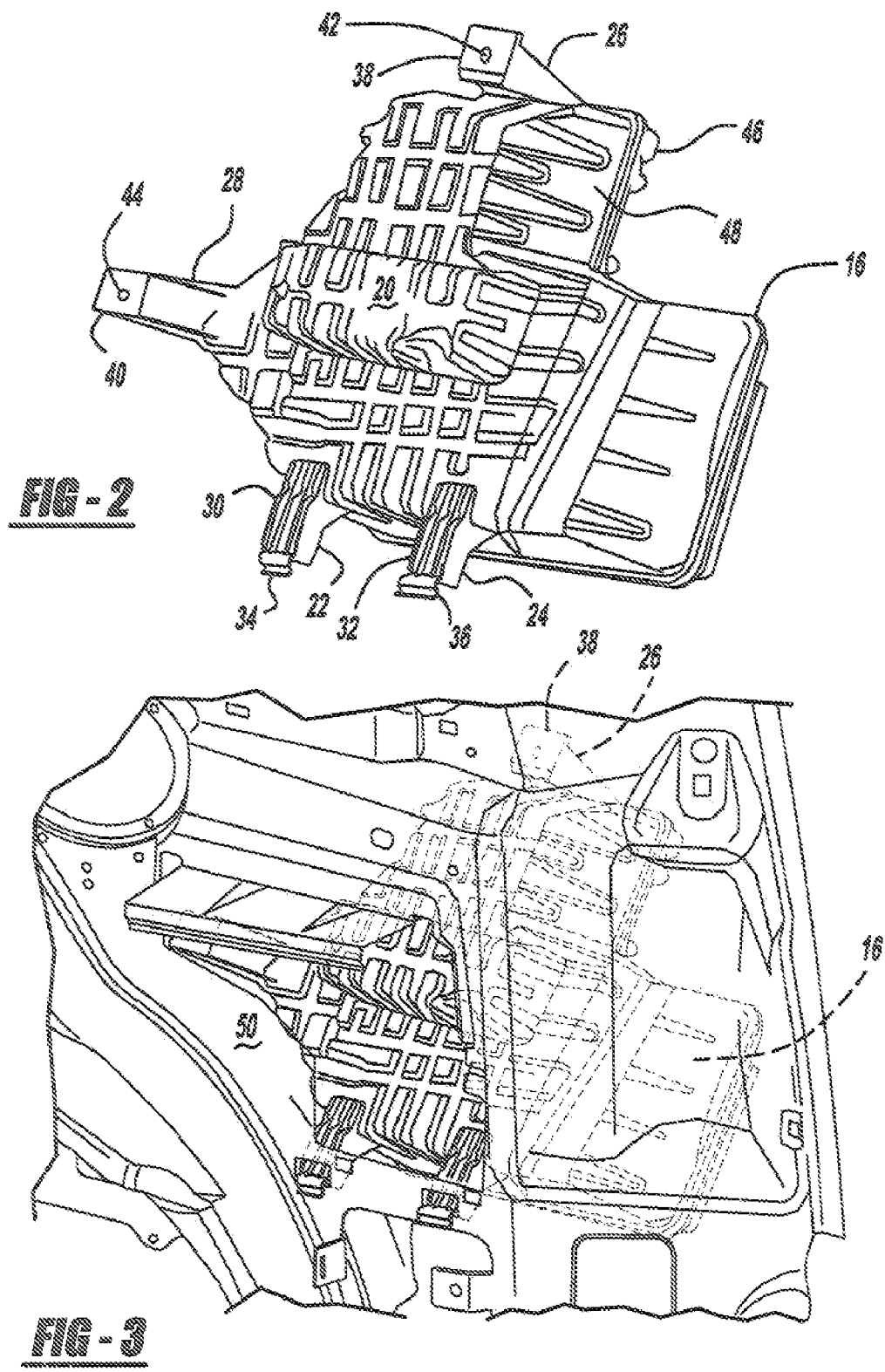

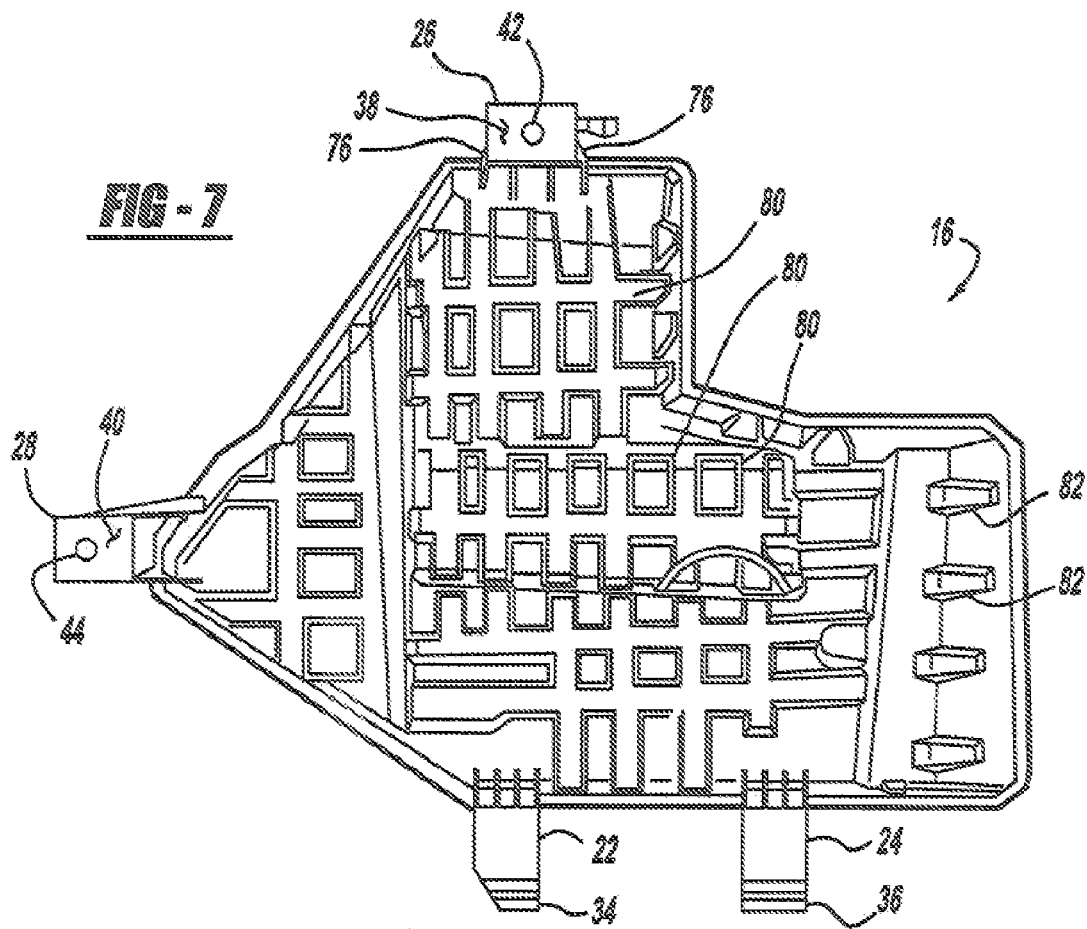
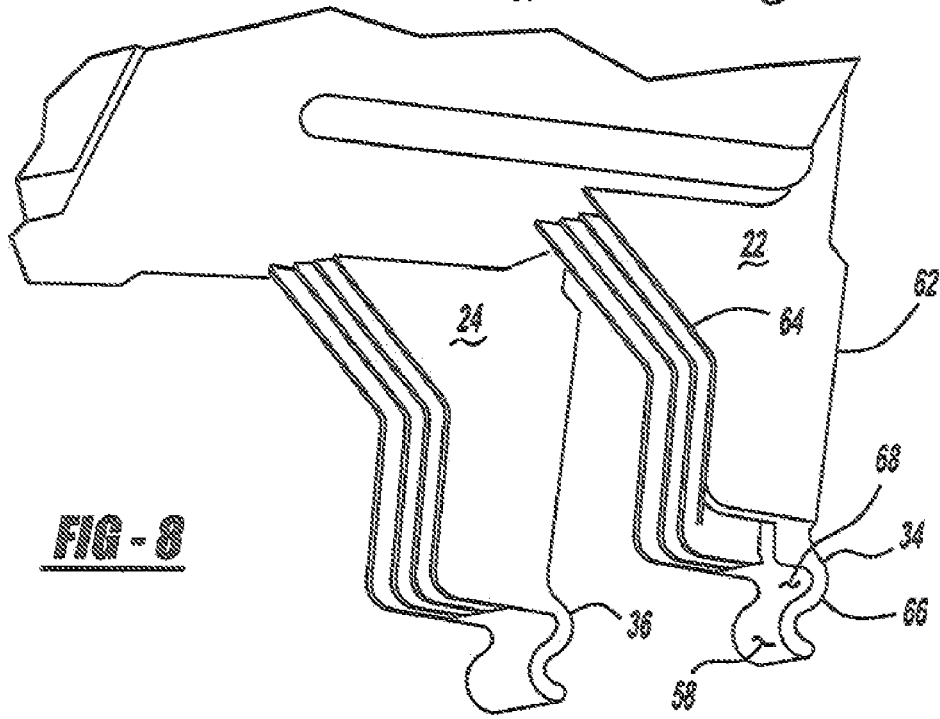

AUTOMOTIVE SPEAKER ENCLOSURE

FIELD OF THE INVENTION

The present invention relates to an automotive speaker enclosure.

BACKGROUND OF THE INVENTION

Vehicle manufacturers and suppliers alike are constantly striving to reach product and assembly goals such as improving product quality, improving manufacturing efficiency, and improving product ergonomics, all while reducing part counts of such products. In some instances multiple goals may be met with a single part improvement. Vehicle stereo components, such as speaker enclosures, which although satisfactory for their given applications, are not without their share of limitations and are in need of product and assembly improvements.

In one example, automobile assemblers and manufacturers have historically had to endure blind or non-viewable installations when installing speaker enclosures through an interior wall of a vehicle when using traditional fasteners, such as screws or bolts. Installing traditional screw-type fasteners during a speaker enclosure installation in a vehicle also usually requires a fastener at each corner of the speaker enclosure which requires the overall use of a large number of fasteners for a production run of vehicles. Additionally, the fasteners may in some fashion protrude from a wall of the speaker enclosure and even vibrate and loosen from their fastened locations after an extended period of time. Finally, the use of traditional fasteners requires the use of traditional tools, such as electric or air powered screwdrivers, which due to the necessity of tool manipulation, may further hinder the installation process in terms of assembly time.

What is needed then is a device that does not suffer from the above limitations. This, in turn, will provide a speaker enclosure that utilizes fewer traditional fasteners, reduces the necessity of traditional tools for installation, facilitates a reduction in separate fastening parts, and that can be more quickly installed in a vehicle inferior wall.

SUMMARY OF THE INVENTION

A speaker enclosure generally employs first and second halves joined to define a cavity between such halves. The enclosure may have two legs protruding from the second half, each leg further employing an elastically resilient s-shaped tab at a distal end of each leg to provide friction against an internal wall of the vehicle. The first and second legs may themselves be biasable and contain strengthening ribs to govern such degree of biasing. The first and second fastener legs may protrude from the speaker enclosure, at least one on a side of the speaker enclosure opposite the first and second legs.

Further areas of applicability of the present invention will become apparent from the detailed description provided hereinafter, it should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a perspective rear view of a speaker enclosure in accordance with an embodiment of the present invention;

FIG. 3 is a perspective view depicting a speaker enclosure in one position of installation in a wall;

FIG. 7 is a rear view of a speaker enclosure depicting points of attachment of the speaker enclosure to a vehicle wall; and FIG. 8 is an enlarged view of legs of the speaker enclosure used to attach the speaker enclosure to a vehicle wall.

DETAILED DESCRIPTION OF THE PREFERRED EMBODIMENTS

Figure 1:
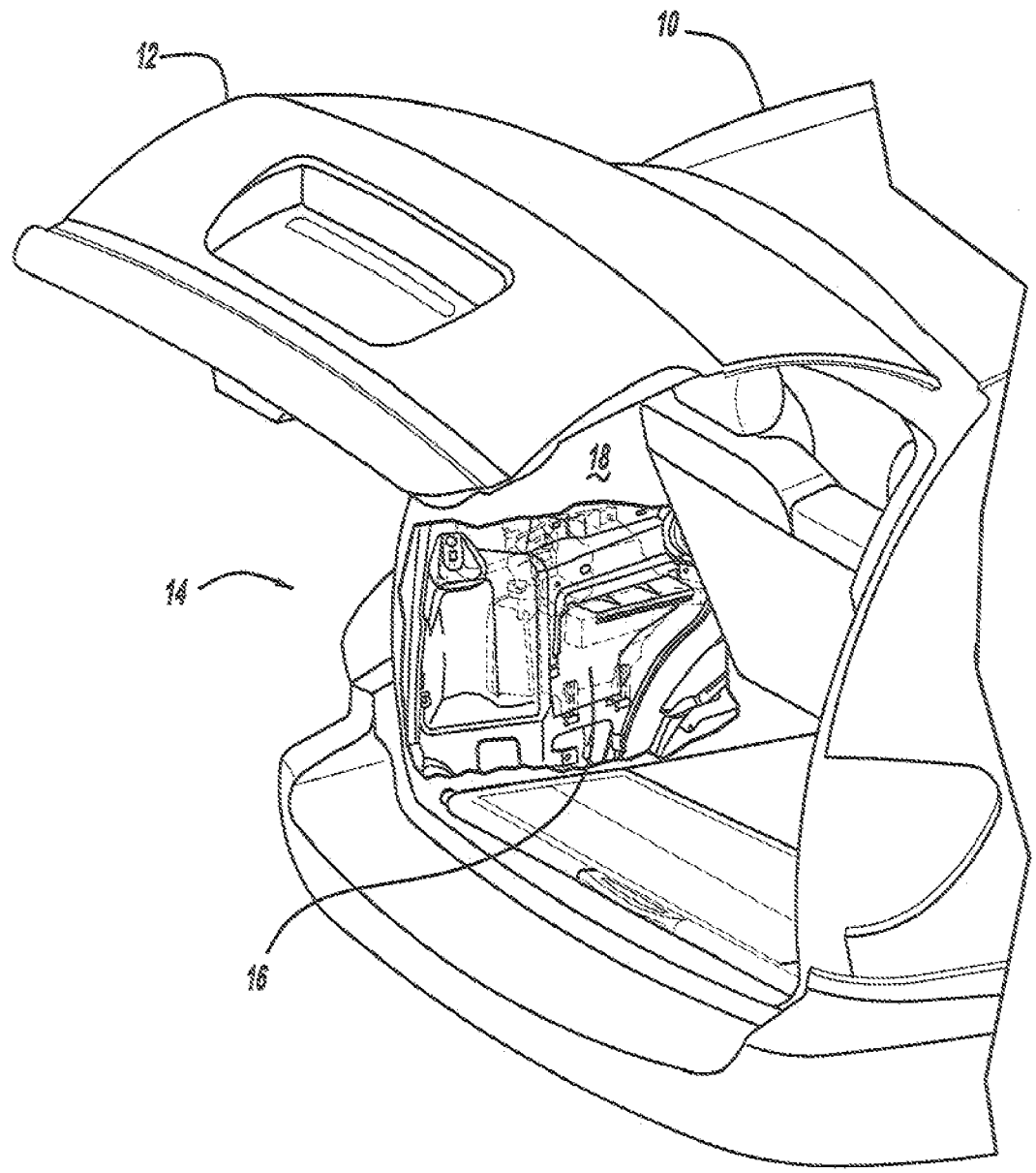
FIG. 1 is a rear perspective view of a vehicle depicting a location of a speaker enclosure.

The following description of the preferred embodiments is merely exemplary in nature and is in no way intended to limit the invention, its application, or uses. Turning to FIG. 1, a perspective view of a vehicle 10 is depicted in which a rear lift gate 12 is in its upward or protracted position thus revealing a location 14 of a speaker enclosure 16. As depicted in FIG. 1, the speaker enclosure 16 is located behind a fascia 18, which in most applications is a piece of plastic that may be covered with carpet or vinyl matting.

Before explaining further details of the speaker enclosure 16 of the teachings of the present invention, it should be noted that the speaker enclosure 16 may be for a subwoofer, which is a type of driver dedicated to the transmittance or reproduction of lower frequencies typical of bass frequencies, such as frequencies in the range from 20 Hz to 200 Hz. However, the teachings of the present invention may be applied to other, non-subwoofer type, speakers, such as traditional, conventional loudspeakers that transmit or reproduce frequencies higher than, or that overlap subwoofer frequencies, such as above 50 Hz.

Turning now to FIG. 2, further details of the speaker enclosure 16 will be presented. The speaker enclosure 16 has a multiple-level rear side 20 that generally lies within the area bounded by a first leg 22, a second leg 24, a first fastener leg 26 and a second fastener leg 28; however, a portion of the rear side 20 lies outside of such bounded area. Continuing, the first leg 22 is reinforced with first ribs 30 while the second leg 24 is reinforced with second ribs 32. Such reinforcing ribs 30, 32 provide the necessary reinforcement and flexibility for the first and second legs 22, 24 as will be discussed below. Additionally, the first leg 22 has a first s-shaped tab 34 while the second leg 24 has a second s-shaped tab 36. The tabs 34, 36 are located at a distal end of the legs 22, 24, that is, at an end of the legs opposite the second half 48. Further details of the function and structure of the s-shaped tabs 34, 36 will be explained below. With continued reference to FIG. 2, the first fastener leg 26 has a first flange 38 with a first hole 42 while the second fastener leg 28 has a second flange 40 with a second hole 44.

Figure 4:
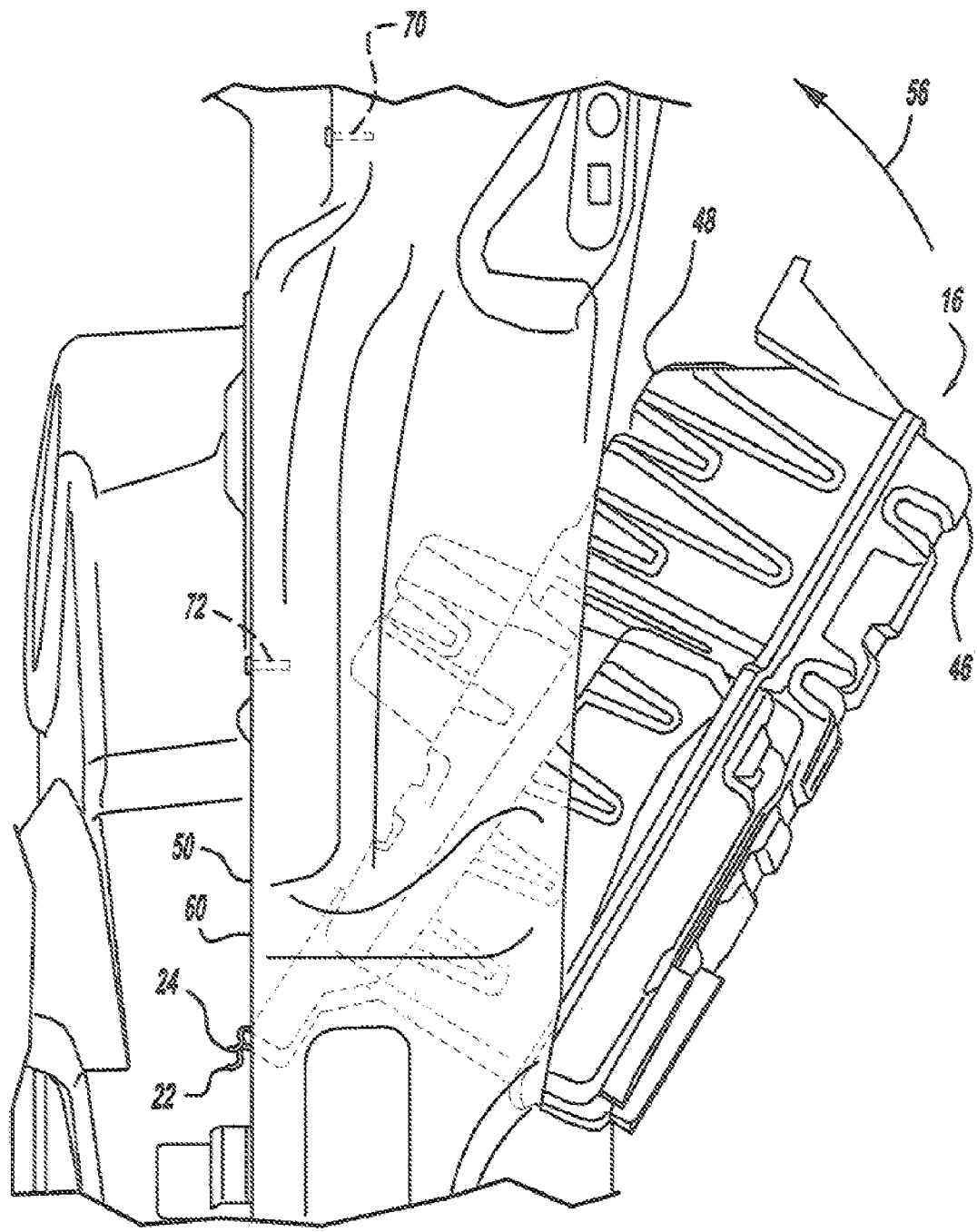
FIG. 4 is a side view of a speaker enclosure from the rear of a vehicle depicting a speaker enclosure in an initial position of installation in a wall.
Figure 5:
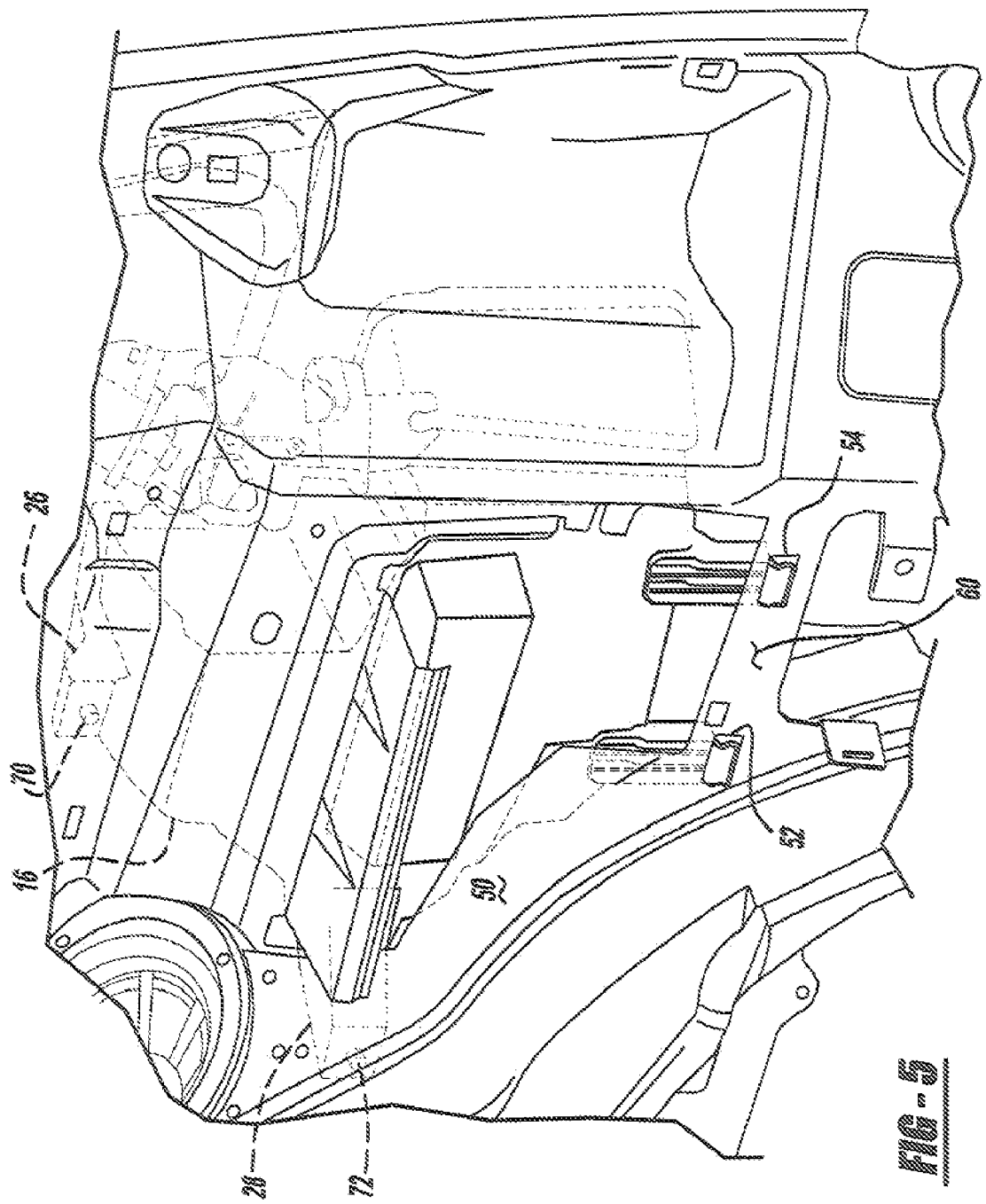
FIG. 5 is a perspective view of a speaker enclosure depicting a speaker enclosure in an installed position within a vehicle wall.

Turning now to FIGS. 3-5, and with continued reference to FIGS. 1-2, installation and structural details of the speaker enclosure 16 will be further described. The speaker enclosure 16 has a first half 46 and a second half 48, each of which are depicted as concave sections, which when joined together, form an internal cavity used in the reproduction of low frequency sound, as mentioned above. The first or front, and second or rear, halves 46, 48 may be manufactured from a plastic material that may be joined in a vibration welding process to ensure their structural integrity such that the halves 46, 48 do not separate after their installation into a vehicle 10. Additionally, welding ensures that air currents will not escape the internal cavity, formed by the mating of the halves 46, 48, during use of the speakers, which could greatly affect sound quality from the speaker mounted in the cavity.

Continuing with a description of an installation of the speaker enclosure 16 into a vehicle 10, the speaker enclosure first may be tilted or angled with respect to an internal wall 50 of the vehicle 10 as depicted in FIGS. 3-4 while the first and second s-shaped tabs 34, 36 of the speaker enclosure 16 are inserted through respective first and second slots 52, 54 of the internal wall 50 of the vehicle 10. Next, the speaker enclosure 16 is pushed toward the internal wall 50 of the vehicle 10 in accordance with the arrow 56 such that the speaker enclosure 16 resides in its installed position that is substantially vertical or vertical, that is, parallel to the internal wall 50, as depicted in FIG. 5. The pushing action by an installer is actually a rotation about the pivot point of the first and second legs 22, 24 in the internal wall 50.

When the speaker enclosure 16 is rotated into its vertical position, the first and second legs 22, 24 and the first and second s-shaped tabs 34, 36 undergo a dynamic loading that imparts stress into the legs 22, 24 and tabs 34, 26 that is responsible for assisting in securing or maintaining the speaker enclosure's 16 installed position against the internal wall 50. For instance, with reference to FIG. 8, the stresses imparted into the first leg 22 will be described. It should be noted that the second leg 24 and second s-shaped tab 36 undergoes the same stress profile; therefore, its description is omitted from this discussion. Continuing, as the speaker enclosure 16 is pressed into its installed position parallel to or substantially parallel to the vertical wall 50, the first leg 22 begins to undergo compression and tension. For example, with reference primarily to FIG. 8, the leg area 62 will undergo compression while the leg area 64 will undergo tension. Such compression and tension are initiated by the first s-shaped tab 34 that is installed through the slot 52. More specifically, when the first s-shaped tab 34 is inserted through the first slot 52, the rounded area 58 contacts the surface of the rear side 60 of the internal wall 50 as the speaker enclosure 16 is moved into its final, or installed position, as depicted in FIG. 5.

As the installation continues, the first s-shaped tab 34 begins to elastically bend or flex thus placing portions of the first s-shaped tab 34 in compression and tension in a similar fashion to the first leg 22. More specifically, the first tab area 66 is placed into compression while the second tab area 68 is placed into tension. Such states of tension and compression of the first s-shaped tab 34 and first leg 22 assist in holding the first rounded area 58 securely against the rear side 60 of the internal wall 50 as depicted in FIG. 5. Continuing, as the speaker enclosure 16 approaches its final installation position, for example, when first and second fastener legs 26, 28 are less than one inch from the internal wall 50 of the vehicle 10, the first rounded area 58 begins contacting the rear side 20 of the internal wall 50. At this point, the internal wall 50, against which the s-shaped tab 34 biases into, may slightly bend or bias and act as a spring and push back against the s-shaped tab 34. Then, as the speaker enclosure 16 continues to be pushed or rotated toward the internal wall 50, the force of the first rounded area 58 against the internal wall 50 continues to increase, which imparts the compressive stress at leg area 62 and at first tab area 66, as discussed above. Additionally, a tensile stress is imparted at leg area 64 and at second tab area 68 as a result of the force of installing the speaker enclosure 16 with first rounded area 58 against the internal wall 50 as the pivot point of rotation as depicted in FIG. 8. To provide strength in the first and second legs 22, 24 to prevent the legs 22, 24 from cracking, breaking or overstressing, first and second ribs 30, 32 are molded into the legs. The s-shaped tab 34 is a design that permits the tab to act as a spring, as opposed to a flat tab, etc.

Upon the speaker enclosure's 16 approach into its secured position, the first fastener leg 26 and second fastener leg 28 are pressed against the internal wall 50. More specifically, the first fastener leg 26 has a first flange 38 with a hole 42 while the second fastener leg 28 has a second flange 40 with a hole 44. The flanges 38, 40 may be strengthened with ribs or side walls. The holes 42, 44 may each align with a corresponding fastener 70, 72, examples of which may be a screw or bolt, to secure the speaker enclosure 16 in its installed position. More specifically, the hole 42 of the first fastener leg 26 may secure over the fastener 70, while the hole 44 of the second fastener leg 28 may secure over the fastener 72, which in FIG. 5 protrudes through the internal wall 50. Because the speaker enclosure 16 is, in at least one embodiment, a plastic ensemble, the first and second fastener legs 26, 28 may be positioned at a variety of locations about the speaker enclosure 16 and with a variety of leg lengths depending upon the location of an actual speaker, be it a subwoofer or loudspeaker. With such leg position and length options, fasteners such as fasteners 70, 72 may be placed at a variety of locations and through a variety of walls, different from the internal wall 50.

With the first and second flanges 38, 40 against the internal wall 50, and the fasteners 70, 72 through the holes 42, 44 of the flanges 38, 40, corresponding nuts (not shown) may be screwed onto the fasteners 70, 72. In another example, instead of using fasteners 70, 72 to protrude through holes 42, 44 and be secured with a nut, a self-tapping screw may be used. With a self-tapping screw, upon forcing the flanges 38, 40 against their respective location on a wall, such as the internal wall 50, the self tapping screws may be inserted through the holes 42, 44 and driven into the internal wall 50 such that the self-tapping screws make their own holes in the internal wall 50 and secure the speaker enclosure 16 to the internal wall. In another example, the screws do not have to be self-tapping, but may simply screw into the sheet metal of the internal wall 50. In yet another example of fastening, a nut (not shown) may be welded to the rear side 60 of the internal wall 50 while a traditional fastener, such as a screw or bolt is placed through each of the holes 42, 44 of the flanges 38, 40 and the internal wall 50 and screwed through the nut welded onto the rear of the internal wall 50.

Figure 6:
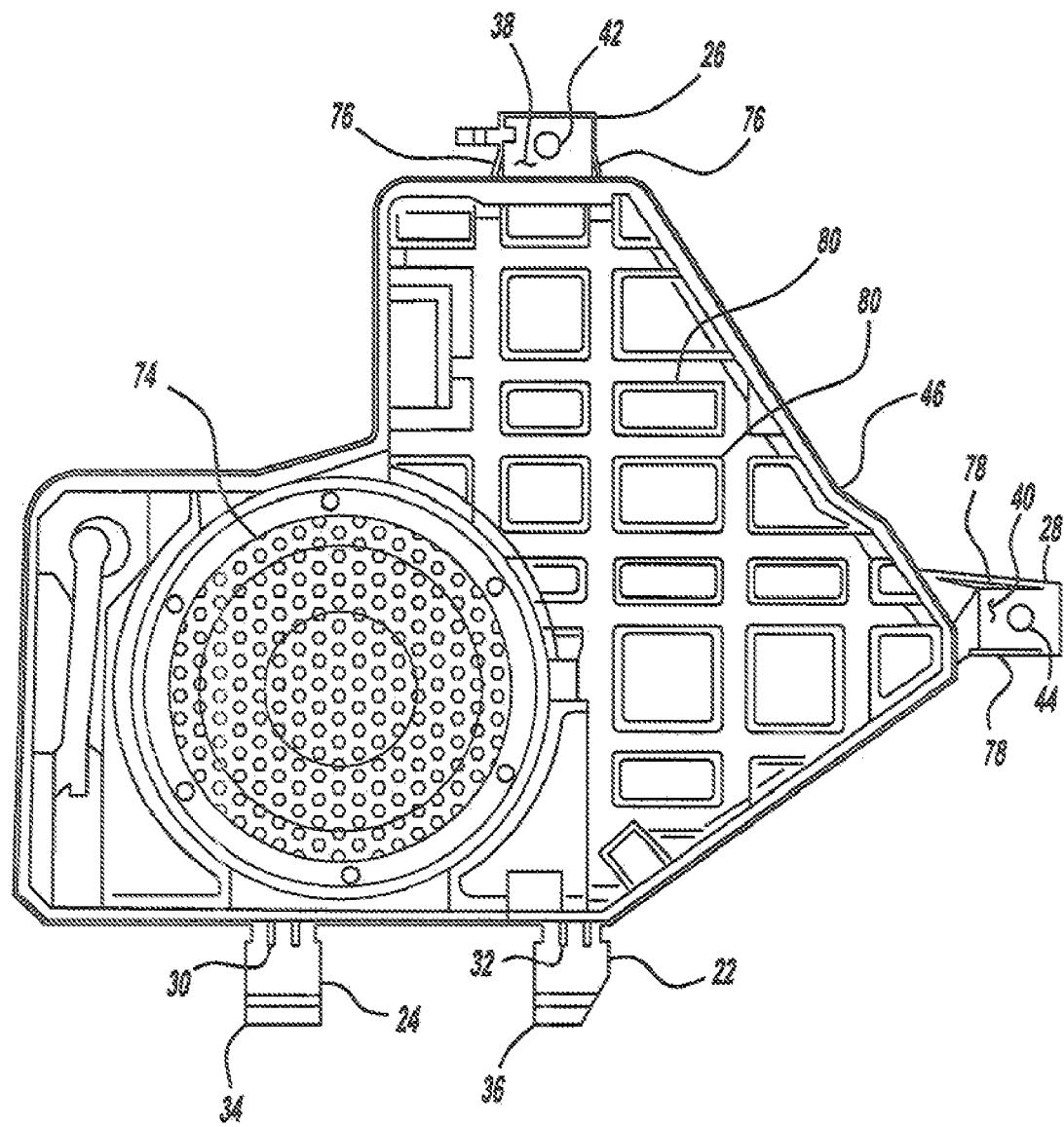
FIG. 6 is a front view of a speaker enclosure depicting points of attachment of the speaker enclosure to a vehicle wall.

With the first and second fastener legs 26, 28 secured into position with fasteners through holes 42, 44, the speaker enclosure 16 is prevented from moving in all three dimensions, up-down, right-left, and for-aft when looking at the speaker enclosure 16 as depicted in FIGS. 1 and 6. Additionally, because two points (flanges 38, 40) are secured to prevent such movements, also prevented are rotations, whether clockwise or counter clockwise. Thus, important advantages of the teachings of the present invention become evident.

First, because the first and second legs 22, 24 are used in place of fastener legs, such as the fastener legs 26, 28, there is a reduction in the use of traditional mechanical fasteners, such as screws or bolts. In the case of the present teachings and Figures, the reduction can be considered to be 50% because two s-shaped tabs 34, 36 are being used instead of traditional fasteners. Second, because less traditional mechanical fasteners are necessary, the installation time of the speaker enclosure 16 into a vehicle 10 is greatly reduced because the first and second s-shaped tabs 34, 36 need only be placed into slots 52, 54 with no further manipulation of any traditional fasteners at the location of the slots 52, 54. Third, although traditional fasteners are not used at the location of the first and second s-shaped tabs 34, 36, due to a normal force of the first rounded area 58 against the infernal wall 50, friction assists in cooperation with the traditional fasteners of the first and second fastener legs 26, 28, in ensuring that the speaker enclosure 16 does not move after installation.

With reference to FIGS. 6 and 7, further details of the speaker enclosure 16 will be presented. FIG. 6 depicts a front view of the speaker enclosure 16, and more specifically, a loudspeaker or subwoofer type speaker 74 is located in an approximately central location within the speaker enclosure 16. Continuing, FIG. 6 also depicts the first and second legs 22, 24, with their respective s-shaped tabs 34, 36 and strengthening ribs 30, 32. At the top of the speaker enclosure 16 is the first fastener leg 26 and flange 38, which may be reinforced with a web or webs 76 on either side of the flange 38. From the front view of FIG. 6, the second fastener leg 28 is depleted with a web or webs 78 to reinforce and provide support for the second flange 40. Resident within or as part of the front or first half 46 are numerous wall strengthening protrusions or recessions 80 that provide strength to the front or first half 46 of the speaker enclosure 16.

FIG. 7 depicts a rear view of the speaker enclosure 16 with additional protrusions 80 or recessions 80 to provide strength to the rear or second half 48 of the speaker enclosure 16. Additionally, specific locations of the speaker enclosure 16 may he reinforced with ribs 82 to provide strength to the wall of the rear or second half 48.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A speaker enclosure comprising:
   a first half;
   a second half joined to the first half thereby defining a cavity between the halves;
   a first leg and a second leg protruding from the second half; and
   an s-shaped mounting tab extending from a distal end of each of the first and second legs, the s-shaped mounting tab being elastically resilient and formed with the first and second legs;
   wherein the s-shaped mounting tab is adapted to engage a structure at a free end thereof, whereby the s-shaped tab is arranged to elastically flex so as to have a first portion in compression and a second portion in tension.

2. The speaker enclosure of claim 1, wherein the first and second legs are biasable such that a first portion can undergo tension and a second portion can undergo compression in response to dynamic loading.

3. The speaker enclosure of claim 1, wherein the first and second legs each further comprise strengthening ribs to resist bending.

4. The speaker enclosure of claim 1, wherein the second half further comprises a first and a second fastener tab.

5. A speaker enclosure comprising:
   a first half;
   a second half welded to the first half thereby defining a cavity between the halves;
   a first leg and a second leg protruding from a bottom of the second half; and
   an s-shaped mounting tab extending from a distal end of each of the first and second legs, the s-shaped mounting tab being elastically resilient and formed with the first and second legs;
   wherein the s-shaped mounting tab is adapted to engage a structure at a free end thereof, whereby the s-shaped tab is arranged to elastically flex so as to have a first portion in compression and a second portion in tension.

6. The speaker enclosure of claim 5, wherein the first and second legs each further comprise ribs to resist bending.

7. The speaker enclosure of claim 5, wherein the first and second legs are biasable such that a first portion can undergo tension and a second portion can undergo compression in response to dynamic loading.

8. The speaker enclosure of claim 5, wherein the second half further comprises a first and a second fastener leg.

9. The speaker enclosure of claim 8, wherein the first and second fastener legs protrude from the second half.

10. The speaker enclosure of claim 9, wherein the first and second fastener legs each define a hole for a fastener.

11. A speaker enclosure for a vehicle wall, comprising:
    a first half;
    a second half welded to the first half thereby defining a cavity between the halves; and
    a first leg and a second leg protruding from a bottom of the second half, the first and second legs each including strengthening ribs arranged to resist bending, and first and second resilient s-shaped mounting tabs protruding from respective distal ends of the first and second legs;
    wherein the s-shaped mounting tabs are arranged to engage the vehicle wall at a free end thereof, whereby the s-shaped mounting tabs are arranged to elastically flex so as to have a first portion in compression and a second portion in tension thereby providing a spring force against the wall.

12. The speaker enclosure of claim 11, wherein the first and second legs are biasable such that a first portion can undergo tension and a second portion can undergo compression in response to dynamic loading.

13. The speaker enclosure of claim 12, wherein the second half further comprises a first and a second fastener leg.

14. The speaker enclosure of claim 13, wherein at least one of the first and second fastener legs are located on a side of the speaker enclosure opposite the first and second legs.

15. The speaker enclosure of claim 14, wherein the first and second fastener legs each define a hole for a fastener.

16. The speaker enclosure of claim 14, wherein the at least one of the first and second fastener legs cooperates with the first and second legs to impart a normal force against the vehicle wall to prevent movement of the speaker enclosure relative to the wall.

17. The speaker enclosure of claim 11, wherein the s-shaped mounting tabs are arranged to be received through respective slots in the vehicle wall such that a curved portion of the s-shaped mounting tabs engage an inner side of the vehicle wall opposite the side of insertion of the s-shaped mounting tab.

* * * * *